(12) United States Patent
Pollklas et al.

(10) Patent No.: US 6,359,403 B1
(45) Date of Patent: Mar. 19, 2002

(54) METHOD AND APPARATUS FOR SETTING THE ROTATION SPEED OF A DRIVE MOTOR OF A WORK MACHINE

(75) Inventors: Manfred Pollklas, Rheda-Wiedenbrueck; Heinrich Isfort, Duelmen, both of (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/567,479

(22) Filed: May 9, 2000

(30) Foreign Application Priority Data

May 12, 1999 (DE) .......................... 199 21 697

(51) Int. Cl.[7] .............................. H02P 7/00; B60K 1/00; A01D 75/28
(52) U.S. Cl. ..................... 318/432; 388/838; 180/65.1; 56/10.2 R
(58) Field of Search ........................ 318/11, 162, 163, 318/164, 139, 432, 433, 434, 268, 272, 587; 180/65.1, 65.6; 388/838; 56/10.2 R, 10.2 G, 11.1; 460/1, 6

(56) References Cited

U.S. PATENT DOCUMENTS

| 4,967,544 A | * | 11/1990 | Ziegler et al. ............ 56/10.2 R |
| 5,489,003 A | * | 2/1996 | Ohyama et al. ............ 318/139 |

FOREIGN PATENT DOCUMENTS

| DE | 200 234/2 | 3/1983 |
| DE | 37 01 331 A1 | 7/1988 |
| DE | 41 11 921 A1 | 10/1992 |
| DE | 35 42 500 C2 | 7/1994 |
| DE | 33 34 723 C2 | 10/1994 |

* cited by examiner

Primary Examiner—Khanh Dang
(74) Attorney, Agent, or Firm—Michael J. Striker

(57) ABSTRACT

The method of setting rotation speed of a drive motor of a work machine, in which the drive motor has a device for control of motor rotation speed and for control of the travel speed independently of the rotation speed, includes setting the rotation speed of the drive motor to be constant during working operation and setting the rotation speed of the drive motor during transport or road travel of the work machine automatically according to the set travel speed of the work machine or according to whether the work machine is in working operation or in transport or road travel. A suitable apparatus is described for performing the method.

15 Claims, 2 Drawing Sheets

METHOD AND APPARATUS FOR SETTING THE ROTATION SPEED OF A DRIVE MOTOR OF A WORK MACHINE

BACKGROUND OF THE INVENTION

1. Field of the Invention

The present invention relates to a method and apparatus for setting a rotation speed of a drive motor or an internal combustion engine of any work machine that is operated at a constant engine or motor rotation speed while working. Especially the method relates to a self-propelled agricultural harvesting machine, such as a chopper-harvester, combine or harvester-thresher.

2. Prior Art

Work machines usually have an internal combustion engine, which drives the individual control or working elements and also can be used as the source of motive power for machine travel. The motors used are designed so that their power fits the required work necessary in the work process. The power provided in work machines, such as baggers, cranes or harvesting machines, is very much larger than necessary for machine travel. During the work process the motors are operated with a rotation speed, which guarantees optimum utilization of the drive power. The rotation speed is usually set so that it is constant. If it is necessary for the work process that the work machine be moved continuously at different travel speeds, the machines are equipped with a travel drive, which may be adjusted independently of the motor speed. The known travel drive is formed as a hydraulic pump/motor unit or as a Variator unit. The travel speed change is obtained by changing the fluid supply rate to the hydraulic motor and/or by changing the fluid volume drawn by the hydraulic motor. A transmission can be connected to the respective drive elements for increasing efficiency. This transmission can be shifted by an adjusting lever or also automatically in a known manner and frequently serves also for travel direction reversal of the work machine, in connection with a Variator travel drive.

The rotation speed of the internal combustion engine is controlled by variation of the amount of fuel injected. The adjustment can take place by a mechanical adjusting lever, electromotorized adjusting spindle, electropneumatically, electrohydraulically or also more recently by means of an electronically controlled fuel injection. In work machines the adjustment of the motor rotation speed is performed in steps or stages and in order to avoid working with incorrect motor rotation speed. Often only two stages are available so that the motor rotation speed can only be the idle speed or the maximum rotation speed necessary for the work process. For transport or road travel two travel speed ranges are needed for conveying travel or road travel, namely travel with motor idle speed or with the working motor speed. When the motor idle speed is used in conveying or road travel, the power performance of the motor in certain cases is insufficient and the motor can be killed or stall. Usually the conveying travel or road travel is performed with maximum motor rotation speed or with working motor rotation speed. This has the disadvantage that the motor or engine of the work machines produces unused drive power during conveying travel or road travel, which leads to unnecessary consumption of fuel and also produces excessive noise in the surrounding environment.

A method of reducing fuel consumption in self-propelled work machines during conveying is known from DD 200 234, in which the fuel consumption of the drive engine is reduced during transport or conveying by using an automatic constant motor speed lowered from the nominal motor rotation speed. The transport gear stage is designed so that the maximum permitted travel speed can be achieved with a reduced engine rotation speed. The vehicle operator sets the motor speed that has been lowered by a predetermined amount prior to the conveying or transport and engages the transport gear stage. A locking device prevents unintended engagement of the transport gear stage at the motor nominal speed. In an additional embodiment of the method, the adjusting of the shift lever is demanded or requested prior to setting the transport gear stage and on engagement of the transport gear stage the motor rotation speed is automatically lowered to the reduced motor rotation speed, at which the motor provides the maximum drive efficiency for conveying or transport.

The fuel consumption is reduced by the proposed method, but the motor rotation speed is optimally reduced only for drive performance during transport. The work machine still burns fuel unnecessarily and produces unnecessary noise at idle or with reduced drive performance requirements.

SUMMARY OF THE INVENTION

It is an object of the present invention to provide a method and apparatus for setting the rotation speed of a drive motor of a work machine of the above-described kind, in which the fuel consumption and noise generation during both transport and road travel are adjusted to optimize work machine performance.

According to the invention this object is attained by a method for setting the rotation speed of the engine in the work machine, in which the set rotation speed of the drive motor depends automatically on the set vehicle travel speed during transport travel or road travel.

By the method according to the invention the fuel consumption and noise generation are both reduced to a considerable extent during transport and road travel. The operator of the work machine, for example, has a switch available in the dashboard for setting the motor rotation speed. When the work machine has finished its work in one location and is required to travel to another location by means of its travel drive, the operator can selected the type of setting for the motor rotation speed according to the invention by means of the switch. The motor rotation speed setting then occurs automatically by setting the vehicle travel speed. These can occur by means of a foot pedal, an adjusting lever, a travel speed lever or also by an electronic determination of the pressure on the travel speed lever.

In the simplest embodiment of the invention the motor rotation speed switches from a higher motor rotation speed to the idle speed of the drive motor, when the vehicle is in the idle condition. This reduces the fuel consumption, for example, at an entrance or at a traffic light and also reduces the noise generation expected at the entrance or light. When the operator activates the drive of the work machine, for example, by operation of the drive pedal, the motor rotation speed is automatically increased from the idle speed to the higher rotation speed.

It is especially advantageous to set the motor rotation speed according to the position of a travel speed lever in a work machine. For example, the fluid feed rate of a hydraulic pump is set by a Bowden cable or by a electrohydraulic adjusting device. When the machine operator moves the travel speed lever into its neutral position during transport or road travel, a switch detects this motion and the motor rotation speed is automatically lowered. The lowering of the rotation speed does not necessarily continue until the idle speed is reached so that a higher motor rotation speed is available during subsequent starting of the work machine.

In work machines, in which the travel speed setting is uncoupled, for example by an electronically controlled adjusting pump, from the drive elements, it is also possible to carry out a changed setting of the vehicle speed either by a change of the motor rotation speed and/or by a change in the fluid feed rate to the hydraulic pump. It is also possible to react in one predetermined speed range by changing the motor rotation speed and in another or in a subsequent vehicle speed range by changing the fluid feed rate. Furthermore the relationship between the fluid feed rate and the motor rotation speed can be adjusted to the performance requirements of the travel drive so that an optimum fuel consumption with a minimum noise generation always takes place. For measurement of the required power performance with a hydrostatic travel drive, the rotation speed set in the drive motor and the feed rate to the adjusting pump or the draw volume of the adjusting motor can be determined with the help of the pressure in the hydraulic system. With an increased drive power demand the rotation speed is set to a higher value and at the same time the feed rate to the drive pump is reduced or the draw volume of the drive motor is increased. This occurs automatically in predetermined stages until the travel speed of the work machine is optimized. During a reduction of the drive power required for the travel drive, the method proceeds in the reverse manner from that described above in connection with the drive power increase.

In an additional embodiment of the invention the rotation speed of the drive motor is set according to the travel speed lever setting the travel speed of the work machine. The advantage of this process is that the work machine behaves for the operator according to the changes of the set travel speed. The machine then reacts like a motor vehicle. Furthermore the method according to the invention can compensate for nonlinearities between the travel speed lever positioning and the control of the travel drive, by a suitably programmed characteristic curve for the motor rotation speed.

Self-powered agricultural harvesting machines are usually equipped with a transmission or gear unit. Because of the transmission the hydrostatic drive unit or Variator can be economical constructed. The maximum achievable travel speed of the work machine is determined also by the selected travel speed range. A work machine has several travel speed ranges, which correspond to the required speeds in working operation and also for transport and road travel. The travel speed ranges for working and for transport and road travel differ from each other by means of different gear ratios in the transmission and other things, also by different preselected hydrostatic adjustments.

In an especially preferred embodiment of the invention the rotation speed of the drive motor is set according to the set travel speed of the work machine only in a predetermined travel speed range for transport and road travel. The selection of the method of setting the rotation speed is performed automatically and provides a further simplification for the machine operator. The selected travel speed range can be provided by known means, such as by a switch on the shift rod or on the transmission for the travel drive, which reads out the selected travel speed range or derives it from control signals for the hydrostatic devices (selected from different feed or draw volume ranges).

In another embodiment of the invention the rotation speed of the drive motor is set according to the set travel speed only during forward travel of the work machine. This is especially advantageous for work machines, which can be controlled for motion in different drive directions by means of a single travel speed lever. The operator of the work machine must observe the rear range, during rearward motion with the help of auxiliary devices, for example a mirror. This is preferably performed at reduced travel speed and at reduced motor rotation speed, so that an approaching person can still pay attention to an acoustic signal. The proposed method automatically lowers the motor speed, which would otherwise be lowered manually and thus an additional simplification is obtained for the operator. Furthermore less noise is produced for the surroundings.

The object of the invention also includes an additional process, in which the rotation speed of the drive motor is automatically set at the idle rotation speed when a change from working operation to transport or road travel is detected. Usually the work machine is prepared for transport to the next work field or for road travel after working operation. For this purpose safety devices, such as boundary lights and protective devices, are added manually to the devices of the work machine. So that the work machine does not consume unnecessary fuel and also does not generate excessive noise for the surroundings, the rotation speed of the drive motor is automatically reduced according to the described method. The change of the work machine, from work operation to transport or road travel can be detected from adjustments made by the machine operator in the work machine or from parameters of the work machine. Furthermore this process provides the advantage of an output adjustment for additional motor rotation speed control for transport or road operation differing from that during working operation.

An additional object of the present invention is an additional process in which the rotation speed of the drive motor is automatically adjusted to the idle rotation speed when a change from the transport or road travel to the working operation is detected. In this process fuel is saved and unnecessary noise is eliminated during the time required for setting the work machine up for working operation. When the work machine is brought, for example at a higher motor rotation speed, into a field, usually the work machine is halted and the protective devices removed and it is adjusted to perform the work process. During this time it is unnecessary to operate the drive motor with a higher rotation speed. This adjustment takes place automatically according to the described process.

The object of the invention is also obtained by an apparatus for performing the above-described method according to the invention. The apparatus includes means for setting the rotation speed of the drive motor according to means which determine the set travel speed of the work machine or which detect when the work machine is performing work or engaged in transport or road travel. Many adjustments of the work machine can be performed by electronically controlled devices. The setting of the travel speed can be performed in various ways and preferably takes place by means of a travel speed lever. The displacement of the travel speed lever from a neutral position in the simplest case is read off by means of a switch. In additional embodiments of the invention the position of the drive speed lever for different displacements is determined over the adjustment range by means of switches or also by means of a potentiometer. The set travel speed is made available to the devices according to the invention by means of known electrical transmission means, such as a vehicle bus system. The apparatus moreover is connected with means that allow a change of the work machine from work operation to transport and road travel, and the reverse, to be detected. This can be a simple switch that is mounted on the fittings of the work vehicle and is operated as needed by the operator.

In an additional embodiment of the apparatus according to the invention the respective changes of the work machine between working operation and transport or road travel can be automatically detected by monitoring at least one position or a combination of positions of different control or working members. The apparatus is thus provided with means that transmit the positions of the control members. For example the apparatus reads the position of the gearshift lever. The control member positions may be correlated individually, or also in certain combinations with other control member positions, with respective usage states of the work machine. The positions of control members in a harvester-thresher include generally the positions of switches in the operating fittings, such as the position of the drive coupling, the position of the gear shift lever or the position of the corn tank extension. If, for example, the drive member, such as the thresher drum, is shut off, the corn tank extension is brought in and put in the travel position, then the harvester-thresher is made ready for road travel. The apparatus of the invention in a chopper-harvester can communicate, for example, the position of the discharge elbow or the transport position of the storage unit or the gear shift lever position. If the discharge elbow does not find itself in the transport position and the road travel configuration is not detected, the harvester-thresher is in its working state.

The fuel consumption and the noise generation is reduced by this apparatus by the automatic setting of advantageous motor rotation speeds according to the method of the invention.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
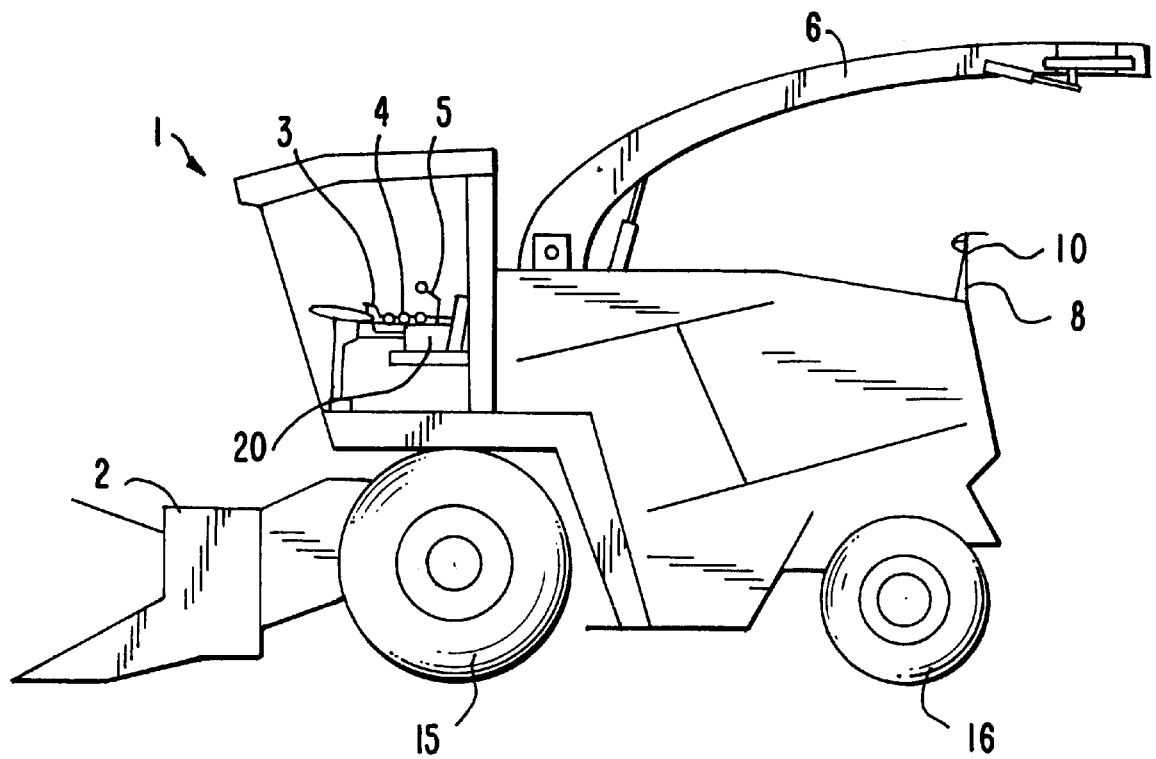
FIG. 1 is a side view of a self-propelled chopper harvester.

FIG. 1 shows a self-propelled chopper-harvester 1, which takes in materials to be harvested from a working field with an attachment 2. It harvests or chops the materials and delivers them by means of an overloading device 6 to a transporting vehicle. During transport or road operation this overloading device 6 is held by a retaining bracket or clamp 8. A sensor 10 is mounted on the retaining bracket 8, which detects the transport position of the overloading device 6. The self-propelled chopper-harvester 1 is an agricultural work machine, which is driven by drive wheels 15 and is guided by steered wheels 16. The steered wheels 16 can be equipped, when necessary, with a drive means. The machine operator can select the motor speed during normal operation by means of a control element 4, which is arranged in a driver's cabin of the self-propelled chopper 1. An approximately constant motor rotation speed is required to guarantee an optimum work process. The self-propelled chopper-harvester 1 is thus equipped with a simple switch, by means of which the machine operator can choose only between the idle speed and the higher motor speed required for the work process. Selection of a motor speed that is too low is thus prevented during operation. The travel speed during a work process is determined during a travel selection stage by means of a lever 5 for selection of a transmission gear and a travel speed lever 3, for continuous variation of the travel speed in the selected travel speed range. The motor rotation speed is set so that it is constant during a work operation, as has already been mentioned. A seat with a side arm 20 is arranged in the illustrated driver's cabin. The adjustable travel speed lever 3 that is movable in a horizontal direction is provided on the side arm 20. The operator can set the desired travel direction and desired travel speed by means of this travel speed lever 3, since it is moved from its center position in the desired travel direction for a sufficient distance until the desired travel speed has been reached by the self-propelled vehicle.

Figure 2:
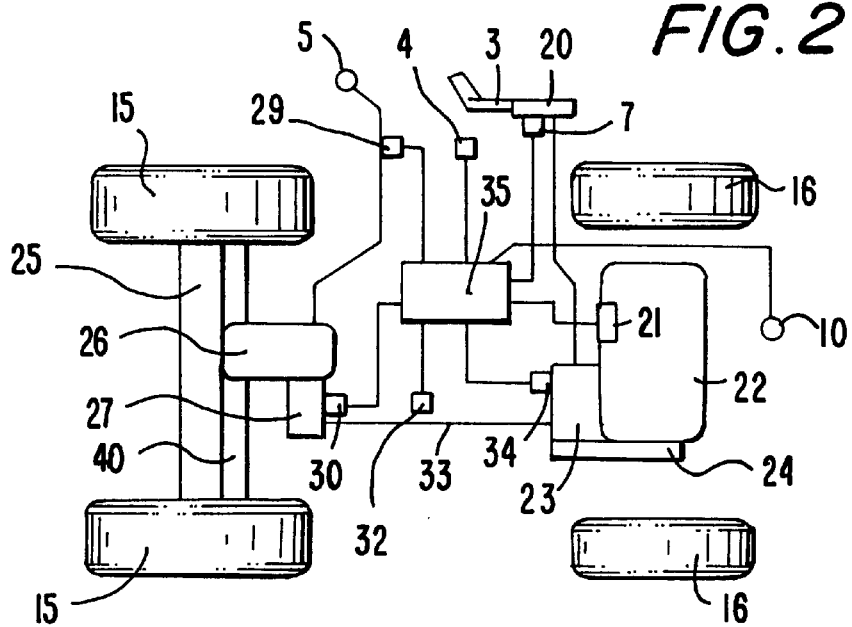
FIG. 2 is a schematic view of the drive components of a self-propelled work machine according to the invention.

A schematic structure of the drive mechanism of a self-propelled chopper harvester 1 is shown in FIG. 2. The drive motor 22 drives a hydraulic pump 23 flange-mounted directly to the drive motor by means of a transmission 24. The flow rate through the hydraulic pump 23 is determined by the drive rotation speed and the pivot angle of the hydraulic pump 23. The drive speed is given by the rotation speed of the drive motor 22 and the connected transmission gear. The pivot angle is set by moving the travel speed lever 3 on the armrest 20 by means of a mechanical connection to the travel speed lever 3. When the travel speed lever is in its neutral position, no hydraulic fluid is fed from the hydraulic pump 23 by means of the hydraulic line 33 to the hydraulic motor 27 and the work machine is not driven. The hydraulic motor 27 is directly connected with a change speed gear 26 and drives the drive wheels 15 by means of the change speed gear 26 and the drive shaft 40. The hydraulic fluid flow rate fed by the hydraulic pump 23 and the so-called draw volume of the hydraulic motor 27 determine the initial speed of the change speed gear 26. The change speed gear 26 produces a certain predetermined rotation speed of the drive shaft 40 on both sides of the change speed gear according to the selected gear, which can be set by means of the shift lever 5 and a mechanical connection to the change speed gear 27. Usually the change speed gear 26 has three different speeds or gears including two different higher gears for performing the work and a low gear for transport or road operation. To set the rotation speed of the drive motor 22 according to the method of the invention, the drive motor 22 is equipped with a controller 21, by means of which the predetermined motor speed received from an electronic analysis circuit 35 is received and set accordingly. The connection between the controller 21 and the analysis circuit 35 is advantageously provided by an electronic bus, preferably operating according to a CAN protocol. The analysis unit 35 is connected with at least one sensor 29 or 4, which indicates to the electronic analysis circuit 35 that the motor rotation speed should be set according to a previously input dependence between the given motor rotation speed and the given travel speed. The sensor 29 is connected with the shift rod or the lever 5 and signals the selected gear of the change speed gear 26 to the electronic analysis unit, for example for transport or road travel. The sensor 4 is an operating element of the operators' console or on the travel speed lever 3 in the driver's cabin of the self-propelled chopper harvester 1, by means of which the electronic analysis circuit 35 can be activated or deactivated. The sensor 4 can be formed as a simple switch for work operation of the self-propelled chopper harvester 1 and can set the idle or nominal rotation speed. When the electronic analysis unit 35 detects the set gear of the transmission 26 for transport or road travel by means of the sensor 29, the rotation speed of the drive motor 22 can be automatically set according to the position of the sensor 4 formed as a switch. The sensor 4 can be a device for manual input of information or input of various values to the electronic analysis unit 35, for example for selection of a predetermined characteristic curve and can also be formed from an individual switch, selector switch or from a plurality of switches and potentiometers or a terminal. The sensor 10 detects the transport position of the overloading device 6 and serves for automatically detecting a change between work operation and transport or road operation, and the reverse. When the harvesting has ended, the overloading device 6 is put on the retaining bracket 8. Because of that the vehicle height of the self-propelled chopper harvester 1 is reduced and the pivoting and retaining mechanism of the overloading device 6 is released from unnecessary mechanical stresses and strains during transport and road operation. When a change from the work operation to transport or road operation is detected, for example by an operation of the sensor 10 in the transport position of the overloading device 6, a lower rotation speed for the working rotation speed of the self-propelled chopper 1 is set by the electronic analysis circuit 35 in the drive motor 22. A higher rotation speed of the drive motor 22 can be selected by the machine operator subsequently by operation of the control element 4. Also when a change of the gear of the change speed gear 26 to the transport or road operation occurs, this change is transmitted to the electronic analysis unit 35 by the sensor 29. The rotation speed set for the drive motor 22 then occurs automatically in the method of the invention, since the position of the travel speed lever 3 relative to the armrest 20 is detected by the sensor 7 and signaled to the electronic evaluation unit 35. The sensor 7 can be a simple switch for detection of the center position or the neutral position of the travel speed lever 3 or a sensor, which permits detection of the relative position and set rotation speed of the drive motor 22, at least in the desired range of relative positions of the travel speed lever 3 to the armrest 20.

The electronic analysis circuit 35 is also connected with sensors and means for detecting and influencing the hydraulic drive devices 23 and 27, by means of which the draw volume of the hydraulic motor can be detected and adjusted. The process in the hydraulic line 33 is also detected by a sensor 32 and transmitted to the electronic analysis unit 35. Furthermore an adjustment and detection means 34, by means of which the flow rate is detected and adjusted, is directly connected with the hydraulic pump 23. This device communicates with the electronic analysis unit 35 advantageously by means of a bus system for determining and influencing the hydraulic drive device. By means of these devices 30, 32 and 34 the electronic analysis circuit 35 is enabled to optimally adjust the travel speed set by the machine operation by means of the relative position of the travel speed lever to the arm rest 20 under consideration of the fuel consumption and the noise produced in the environment. A desired set travel speed v is derived by the electronic analysis unit 35 from the known rotation speed, the flow rate and the draw volume of the hydrostatic drive and the known gear ratio of the transmission gear of the transmission 26. The actual travel speed of the self-propelled chopper harvester 1 can also be determined, but is not determined in the illustrated embodiment and has no influence on the set rotation speed nm of the drive motor 22. Because of this feature the actual drive feel is produced for the operator, in which there is not automatic travel speed control with corresponding rotation speed variation of the drive motor during changing travel performance requirements for the travel drive and the motor rotation speed is increased or decreased by it as actually required according to the requirements. Changes of the performance requirements of the travel drive during transport or road travel with the aid of a motor rotation speed suppression can be detected by a pressure measurement in the hydraulic drive system or by a suitable torque measurement in the mechanical drive train. The electronic analysis circuit 35 can receive these performance requirements by suitable means, for example by a vehicle bus system. An appropriate reaction to the corresponding requirements however occurs according to the invention by the electronic analysis unit 35 only with the aid of predetermined characteristic curves, which have been previously input to the electronic analysis circuit 35, since the hydrostatic drive system 23, 27, 33 may also be adjusted by a variation of the draw volume or the feed volume of the respective units 30,34, also it is conceivable to perform this adjustment with only the unit 30 or 34.

Figure 3:
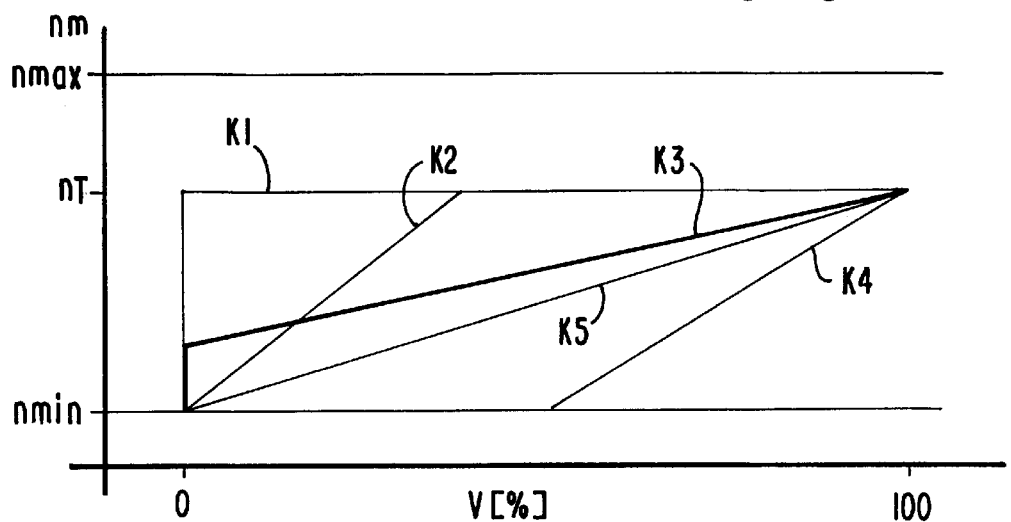
FIG. 3 is a graphical illustration of several exemplary characteristic curves for the relationship between the vehicle speed and the motor rotation speed during forward travel of the work machine.

In FIG. 3 different characteristic curves K1 to K5 are illustrated. These characteristic curves K1 to K5 describe the cooperation according to the invention between the set travel speed v and the drive motor rotation speed nm according to different methods. The setting of the travel speed v occurs, according to the embodiment shown in FIGS. 1 and 2, by moving the travel speed lever 3 on the armrest 20 of the seat, on which the machine operator sits during the work and transport or road travel. During work operation this motion is immediately converted into a corresponding feed volume or flow rate of the hydraulic pump 23 or into a suitable draw volume of the hydraulic motor 27, with constant set rotation speed in the drive motor 22. However if transport or road travel is detected by the electronic evaluation circuit 35, the drive motor rotation speed nm is given according to the set travel speed v with the aid of at least one characteristic curve stored in the electronic analysis unit 35. The rotation speed of the drive motor 22 can be varied by the motor controller 21 between an idle rotation speed nmin and a maximum rotation speed nmax. The set travel speed v is given in percent in FIG. 3 since the use of the method of the invention is not limited to any one travel speed range. Self-propelled agricultural vehicles have a travel speed range of 0 to 20 km/h with an increasing trend up to 40 km/h.

The illustrated characteristic curves K1 to K5 have a common origin and a common end point. The rotation speed of the drive motor 22 is set at the idle rotation speed nmin by the electronic analysis unit 35, when the travel speed lever 3 is set in the central or neutral position, which corresponds to a set travel speed v of 0% or to the work machine standing still. Certain applications may arise in which the lower preset rotation speed nmin should be set higher than the idle rotation speed of the drive motor 22, for example to guarantee the work performance while the work machine is standing still. The selection of a minimum rotation speed with the work machine at a stand still corresponds to minimum fuel consumption and reduced noise generated in its surroundings. The end point of the characteristic curve is determined by the maximum performance requirements of the drive mechanism with maximum set travel speed v. Different characteristic curves are generated for the respective applications between these points and stored in the electronic analysis unit 35 for selection according to the application. Characteristic curve K1 shows the simplest application of the method according to the invention, which already provides an enormous saving of fuel and reduced noise generation. For that application the travel speed lever 3 is equipped only with a simple switch 7, which detects the neutral position of the travel speed lever 3 and communicates with the electronic analysis unit 35. This position of the travel speed lever 3 is preset by the machine operator for the halted self-propelled chopper-harvester, for example at an entrance or red light and during a change of the work machine from road travel to work operation or the reverse. Only if the travel speed v is preset at 0% then the rotation speed of the drive motor is set to a minimum rotation speed nmin. When the machine operator moves the travel speed lever 3 from the neutral position, a higher rotation speed nT, which corresponds to the performance requirements at maximum travel speed v, is set.

The characteristic curve K2 shows another characteristic curve, in which the set rotation speed nm in the drive motor 22 varies from nmin to nT and directly proportional to the set travel speed v in the illustrated manner only in a travel speed range of from v=0% to for example 40%. In the following travel speed range from v=40% to 100% the motor rotation speed no longer changes. The sensor 7 for detection of the displacement of the travel speed lever 3 must thus not measure the displacement by means of the entire motion of the travel speed lever 3 and can be economically made. By setting the rotation speed nm in the drive motor 22 according to characteristic curve K2 an increased acceleration of the self-propelled field copper 1 from a standing still position takes place, since the flow rate to the hydraulic pump 23 and the rotation speed of the drive motor are simultaneously increased in the first travel range from v=0% to 40%.

Characteristic curve K3 originates with a discontinuous jump of the set rotation speed nm for the drive motor 22 when the machine operator moves the travel speed lever 33 from the neutral position. Subsequently the set rotation speed nm increases proportional to the set travel speed v. Because of that an increased drive torque is available during the drive process for the self-propelled chopper-harvester 1, since an increase in the drive torque can be delivered by the hydraulic drive system because of the higher set motor rotation speed. The set rotation speed nm of the drive motor 22 occurs by means of the travel speed lever 3, since an additional deflection of the travel speed lever 3 calls for an additional increase of the set rotation speed nm. Minimum fuel consumption and reduced noise when the work machine is standing still result from this method, with the aid of characteristic curve K3, efficient starting travel of the self-propelled field-chopper 1 occurs and fuel consumption and noise production are adjusted during travel.

In FIG. 3 the characteristic curve K4 illustrates an additional possible set rotation speed behavior for the drive motor 22 in which the set rotation speed depends on the set travel speed v, which is suitable for yard operation. When the work machine is standing still (v=0%) the idle rotation speed nmin of the drive motor 22 is set and it is maintained for a travel speed range up to v=50%, for example. Subsequently the set rotation speed nm of the drive motor 22 increases directly proportional to the set travel speed v until at the maximum set rotation speed nmax at a travel speed v=100%. Hereby yard operation may be performed during transport and road operation of the work machine with lower rotation speed nm of the drive motor 22 without achieving a high acceleration of the work machine. Fuel consumption is reduced and the environment is spared from unnecessary noise.

The characteristic curve K5 illustrates a simple application for the method according to the invention. The setting of the rotation speed nm of the drive motor 22 occurs over the entire travel speed range of v=0% to 100% with a proportionality relationship. This proportionality relationship is a special relationship derivable by the machine operator, since the rotation speed of the drive motor 22 depends directly on the desired travel speed v. An increase of the set travel speed v, for example by an additional deflection of the travel speed lever 3 from its neutral position, causes an increase of the feed rate or a reduction of the draw volume of the hydraulic drive units 23,27 and an increase of the rotation speed of the drive motor.

All the characteristic curves K1 to K6 can be extended into a second quadrant of the coordinate system by keeping the rotation speed nm of the drive motor set to a constant speed for reverse travel. The characteristic curves K1 to K5 shown in FIG. 3 can however be used for the travel range in the opposite travel direction, also for reverse travel. Also the characteristic curves K1 to K5 illustrated in the second quadrant are the reflection of those in the first quadrant about the ordinate. A completely different characteristic curve from that for forward travel can be used for reverse travel.

Figure 4:
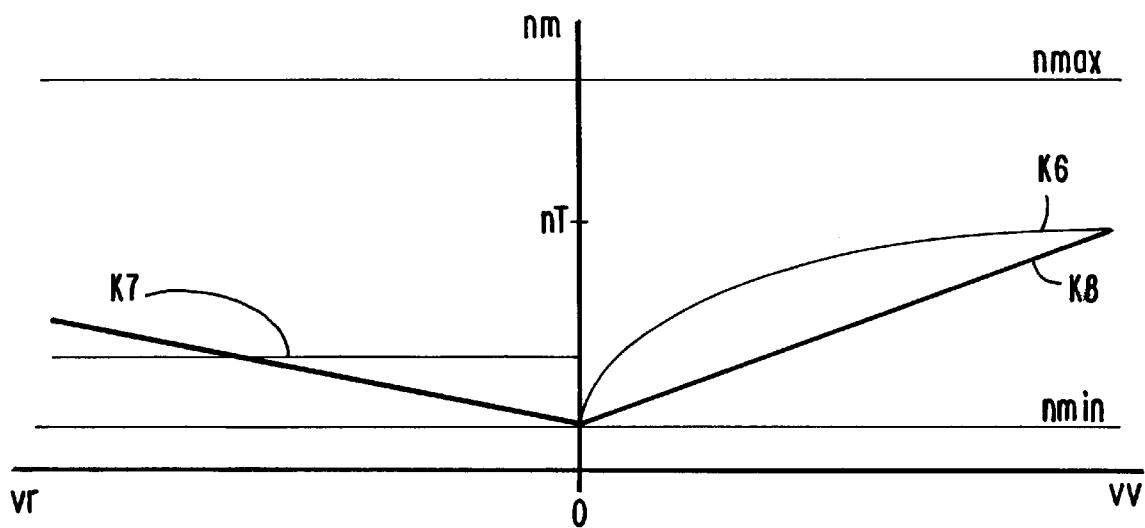
FIG. 4 are similar graphical illustrations for both travel directions.

FIG. 4 shows additional characteristic curves K6 to K8 for the set rotation speed of the drive motor in forward and reverse travel of the self-propelled chopper-harvester. The characteristic curve K6 shows a nonlinear relationship of the set rotation speed nm according to the set travel speed v. Thus it is provided during forward travel that a greater change is experienced at the start from the neutral position or when the work machine is standing still. However the rate of speed change is reduced with increasing set travel speed vv until at zero. The characteristic curve K6 is thus a combination of the characteristic curve K2 and K3 and has the additional advantage that no discontinuous changes occur in the set rotation speed of the drive motor 22 occur. This characteristic cure K6 produces a higher starting torque with decreased acceleration of the work machine without a noticeable transition for the operator or driver. Note here, as also with other characteristic curves, that the actual travel speed of the self-propelled work machine is not directly set with the set travel speed vv preset with the travel speed lever 3, but it is given by an adjustment of the drive devices 23, 24, 26 and 27 and the rotation speed of the drive motor 22. When the flow volume of the hydraulic pump 23 in the drive device is exclusively directly proportional to the deflection of the travel speed lever 3 from the neutral position, a travel speed behavior of the work machine results, which initially is determined more from the rotation speed changes of the drive motor 22 and increasingly more by the adjustment of the hydraulic pump 23 by the sum of both changes, in connection with the setting of the rotation speed nm of the drive motor 22 with the aid of characteristic curve K6. During reverse motion vr, the set rotation speed nm of the drive motor 22 in the neutral position of the travel speed lever 3 is reduced to the idle rotation speed nmin and then discontinuously increased or jumped to a constant value according to characteristic curve K7 by deflection of the travel speed lever 3.

The characteristic curve K8 in FIG. 4 is illustrated by a bold solid line extending in both travel directions. In both travel ranges, the set rotation speed nm is proportional to the set travel speeds vv and vr, but the maximum possible motor rotation speed at the maximum travel speed differs in the respective travel directions. Because of this characteristic curve K8 the actual vehicle travel speed of the work machine in both travel directions follows the set travel speed vr,vv proportionally according to the travel speed lever 3.

The method according to the invention and the associated apparatus are not limited to the embodiments and applications disclosed in this detailed description. The features and operation of the devices and sensors used in the apparatus for performing the method according to the invention which were not described here are known to those skilled in the art.

It is also conceivable for one skilled in the art to directly correlate the rotation speed of the drive motor or the adjustment of the drive devices with the travel speed set with the travel speed lever displacement automatically by means of the electronic analysis unit so that the travel speed is a result of a combination of the possible embodiments, whereby an optimum fuel consumption and suitable reduced noise production are attained.

The disclosure in German Patent Application 199 21 697 of May 12, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and apparatus for setting a rotation speed of an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A method of setting rotation speed of a drive motor of a work machine, said drive motor having at least one device for control of the rotation speed of the drive motor and at least one device for control of the travel speed of the work machine independently of the rotation speed of the drive motor, said method comprising the steps of:
   a) setting the rotation speed of the drive motor to be constant during working operation; and
   b) setting the rotation speed of the drive motor during transport or road travel of the work machine automatically according to a set travel speed of the work machine.

2. The method as defined in claim 1, wherein the setting of the rotation speed of the drive motor occurs according to a position of a travel speed lever determining the set travel speed of the work machine.

3. The method as defined in claim 1 or 2, wherein the rotation speed of the drive motor when the work machine is standing still is selected to be less than the rotation speed of the drive motor when the working machine is traveling.

4. The method as defined in claim 1 or 2, wherein the rotation speed of the drive motor set during the setting occurs according to the set travel speed of the work machine only in a certain predetermined travel speed range.

5. The method as defined in claim 1 or 2, further comprising providing the work machine with a drive train and hydraulic drive means including means for moving the work vehicle and determining a load on the means for moving the work vehicle during the setting of the rotation speed and accounting for the load during the setting of the rotation speed, increasing the rotation speed of the drive motor set with increased drive performance requirements for the drive train of the work vehicle and at the same time reducing a feed rate for the hydraulic drive means of the work machine so that the set travel speed of the work machine is optimized.

6. The method as defined in claim 1 or 2, further comprising providing the work machine with a drive train and hydraulic drive means including means for moving the work vehicle and determining a load on the means for moving the work vehicle during the setting of the rotation speed and accounting for the load during the setting of the rotation speed, decreasing the rotation speed of the drive motor set with reduced drive performance requirements for the drive train of the work vehicle and at the same time increasing a feed rate for the hydraulic drive means of the work machine so that the set travel speed of the work machine is optimized.

7. The method as defined in claim 2, wherein the rotation speed of the drive motor is set during the setting so as to be proportional to the position of the travel speed lever setting the set travel speed of the work machine, in relation to a neutral position of the travel speed lever.

8. The method as defined in claim 2, wherein the setting of the rotation speed of the drive motor according to a set travel speed of the work machine only occurs during a preselected travel speed range provided for transport and road travel.

9. The method as defined in claim 1, wherein the setting of the rotation speed for the drive motor according to the set travel speed of the work machine occurs only during forward travel of the working vehicle.

10. A method of setting rotation speed of a drive motor of a work machine, said drive motor having at least one device for control of the rotation speed of the drive motor and at least one device for control of the travel speed of the work machine independently of the rotation speed of the drive motor, said method comprising the steps of:
   a) setting the rotation speed of the drive motor to be constant during working operation; and
   b) automatically setting the rotation speed of the drive motor to an idle rotation speed when a change from said working operation to transport or road travel occurs.

11. A method of setting rotation speed of a drive motor of a work machine, said drive motor having at least one device for control of the rotation speed of the drive motor and at least one device for control of the travel speed of the work machine independently of the rotation speed of the drive motor, said method comprising the steps of:
   a) setting the rotation speed of the drive motor to be constant during working operation; and
   b) automatically setting the rotation speed of the drive motor to an idle rotation speed when a change to said working operation from transport or road travel occurs.

12. The method as defined in claim 1, 10 or 11, wherein said work machine is a self-propelled harvesting machine.

13. An apparatus for setting rotation speed of a drive motor of a work machine, said apparatus comprising:
   means for setting the rotation speed of the drive motor to be constant during working operation independently of the travel speed of the work machine;
   means for determining a set travel speed of the work machine;
   means for detecting transport or road travel or working operation of the work machine;
   means for setting the rotation speed of the drive motor during transport or road travel of the work machine automatically according to said means for determining the set travel speed of the work machine or said means for detecting the transport or road travel or working operation of the work machine.

14. The apparatus as defined in claim 13, further comprising control members and wherein said means for detecting the transport or the road travel or working operation of the work machine includes means for detecting at least one position of at least one of the control members, and wherein said at least one position is characteristic of at least one of the transport, road travel and working operation of the work machine.

15. The apparatus as defined in claim 13, wherein said work machine is a self-propelled harvesting machine.

* * * * *